April 7, 1925.  1,532,808
E. J. GILLIGAN
LOOM PICKER
Filed Nov. 30, 1923
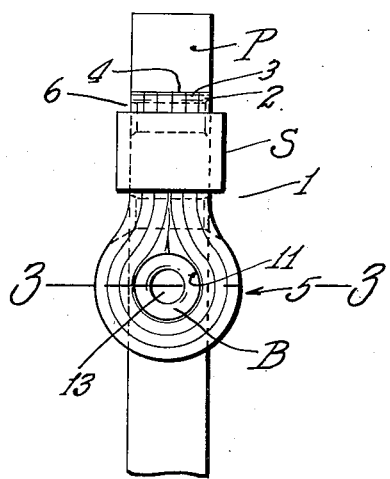
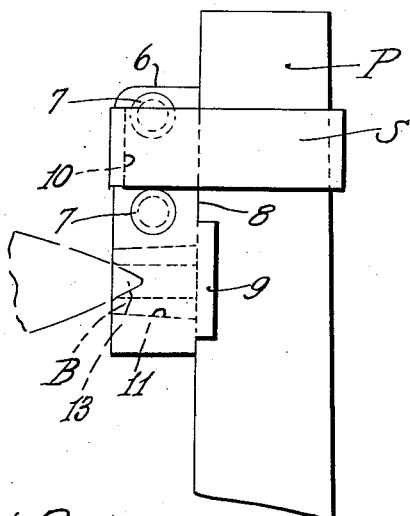
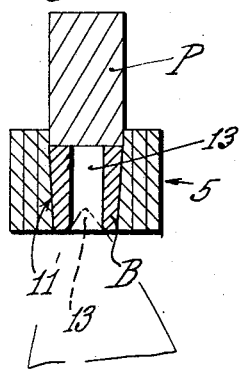
INVENTOR
Edward J. Gilligan
BY Chapin & Neal
ATTORNEYS Patented Apr. 7, 1925.

1,532,808

UNITED STATES PATENT OFFICE.

EDWARD J. GILLIGAN, OF SOUTH HADLEY, MASSACHUSETTS.

LOOM PICKER.

Application filed November 30, 1923. Serial No. 677,854.

*To all whom it may concern:*

Be it known that I, EDWARD J. GILLIGAN, a citizen of the United States, residing at South Hadley, in the county of Hampden and State of Massachusetts, have invented new and useful Improvements in Loom Pickers, of which the following is a specification.

This invention relates to improvements in loom pickers and is particularly concerned with pickers that are carried by the picker stick of a loom for throwing the shuttle back and forth across the lay.

One of the objects of my invention is the provision of a picker having a bunter or shuttle striking member carried and held in abutment with the stick whereby the force of the shuttle blow is transmitted directly to the stick and whereby the successive blows of the shuttle are restrained from any tendency to twist the picker on the stick.

Another object of the invention is the provision of a bunter of hard unyielding material adapted to resist wear and tear and easily replaceable independently of the picker so as to reduce repair costs to a minimum. The hard unyielding bunter is preferably ferrule like in shape and its axial opening is adapted to receive the point of the shuttle so that the rim of the bunter abuts the shuttle at a distance from its point whereby said point is protected and not marred or burred by any contact with the picker. Other objects and advantages will be apparent from the following description and accompanying drawings in which:

Fig. 1 is a side elevational view showing my improved picker detachably secured to the upper end of a picker stick.

Fig. 2 is an end elevational view of the same; and

Fig. 3 is a sectional elevational view taken on the line 3—3 of Fig. 2.

Referring to the drawings the invention will now be described in detail. The picker body 1 preferably consists of a plurality of laminated raw hide strips 2, 3, and 4 bent or otherwise shaped to form a lower eye portion 5 and upper tongue portion 6 extending therefrom. The raw hide strips are preferably bent as shown so as to lie closely adjacent one another and are secured rigidly together by means of rivets or the like indicated at 7. The body thus formed of the several layers of raw hide strips is preferably treated or cured to harden or stiffen the same to provide a substantially rigid and solid unit.

The rear face 8 of the body is preferably flat and adapted to lie against the forward face of the picker stick P while flanges 9 extend rearwardly of the eye portion 5 and embrace opposite sides of the said stick to locate and fixedly align the picker thereon, and prevent any twisting of the picker on the stick from successive blows of the shuttle. A groove 10 is provided in the front face of the picker tongue portion as shown for receiving the securing strap S that is adapted to encircle the picker and stick P. The said strap is preferably of strong flexible material such as raw hide or the like best adapted to hold the picker firmly in place and against the picker stick.

A central opening or bore 11 is provided in the eye 5 of the body 1, the walls of which are tapering and converge toward the forward or outer face of the said picker. This converging bore or opening 1 may be produced by drilling, reaming, or the like. A ferrule-like bunter B having a conically tapered outer surface is adapted to interfit the opening 5 of the picker 1 and is preferably so sized with respect to the bore that it may be inserted from the rear of said picker with a very tight fit therein. The axial opening 12 extending through the bunter as shown is adapted to receive the point 13 of the shuttle 14 without contact therewith. The bunter B is preferably made of a hard unyielding material such as hard composition, fiber, bakelite, or the like, having much longer wearing qualities than raw hide, such as has been previously used in a picker to receive the point of the shuttle. Furthermore, since a bunter of such material is essentially non-yielding and non-distortible and is backed up directly by the picker stick and prevented from twisting thereon, the receiving aperture for the shuttle does not become displaced or mis-shaped even after long continued use as is the case with the usual raw hide aperture. Therefore, the throw of the shuttle from such a picker and bunter as described is always uniform and can be very definitely controlled.

The bunter B may be easily removed for replacement when worn out, although in practice this has not been found necessary since a bunter of this hard wearing material will usually outlast the usefulness of the raw hide portions of the picker. Heretofore, the life of a picker has been determined by condition of the shuttle receiving socket which deteriorates much more rapidly than the body of the picker.

It will be further noted that the point 13 of the shuttle does not come into contact with the bunter and that the possibility of an injury to the point is thus eliminated. Further, the impact of the thrust is distributed over a comparatively large area since the contacting surface is a ring as distinguished from a point contact.

What I claim is:

1. The combination with a picker stick of a picker comprising, a body of yielding material and a shuttle striking bunter of unyielding material, said bunter being ferrule-shaped to receive the point of the shuttle without contact therewith, means to secure the upper part of said body to said picker stick, and means to retain the lower part of said body against twisting on said picker stick, said bunter having its rear side in sole abutting contact with said picker stick.

2. The combination with a picker stick of a picker comprising, a body of raw hide secured to the picker stick and provided with a tapered opening converging forwardly from the picker stick, and a tapered ferrule of hard fiber composition fitted in said opening for serving as the shuttle strike, the rear side of said ferrule having direct abutting contact with said picker stick.

3. The combination with a picker stick of a picker comprising, a body of laminated raw hide formed into a lower eye portion and upper tongue portion and provided with a tapered opening converging forwardly from the said stick and portions extending laterally from said eye portion for engaging the sides of said stick, a securing strap engaging the tongue portion and said stick, a ferrule of hard composition fiber carried in said eye portion for serving as the shuttle strike, the rear side of said ferrule having direct abutting contact with said picker stick.

In testimony whereof I have affixed my signature.

EDWARD J. GILLIGAN.